CHANNEL SWITCHING IN VOICE CURRENT REPEATER STATIONS

Filed Nov. 23, 1946 2 Sheets-Sheet 1

INVENTORS.
ROSWELL H. HERRICK
RALPH R. FOWLER
ROBERT P. DIMMER
BY [signature]
ATTORNEY

CHANNEL SWITCHING IN VOICE CURRENT REPEATER STATIONS

Filed Nov. 23, 1946 2 Sheets-Sheet 2

INVENTORS.
ROSWELL H. HERRICK
RALPH R. FOWLER
ROBERT P. DIMMER
BY
Chas. W. Candy
ATTORNEY Patented May 15, 1951 2,552,787

UNITED STATES PATENT OFFICE 2,552,787

CHANNEL SWITCHING IN VOICE CURRENT REPEATER STATIONS

Roswell H. Herrick, Lorain, Ohio, and Ralph R. Fowler, Oak Park, and Robert P. Dimmer, Chicago, Ill., assignors to Automatic Electric Laboratories, Inc., Chicago, Ill., a corporation of Delaware Application November 23, 1946, Serial No. 711,962

3 Claims. (Cl. 179—170)

Figure 1:
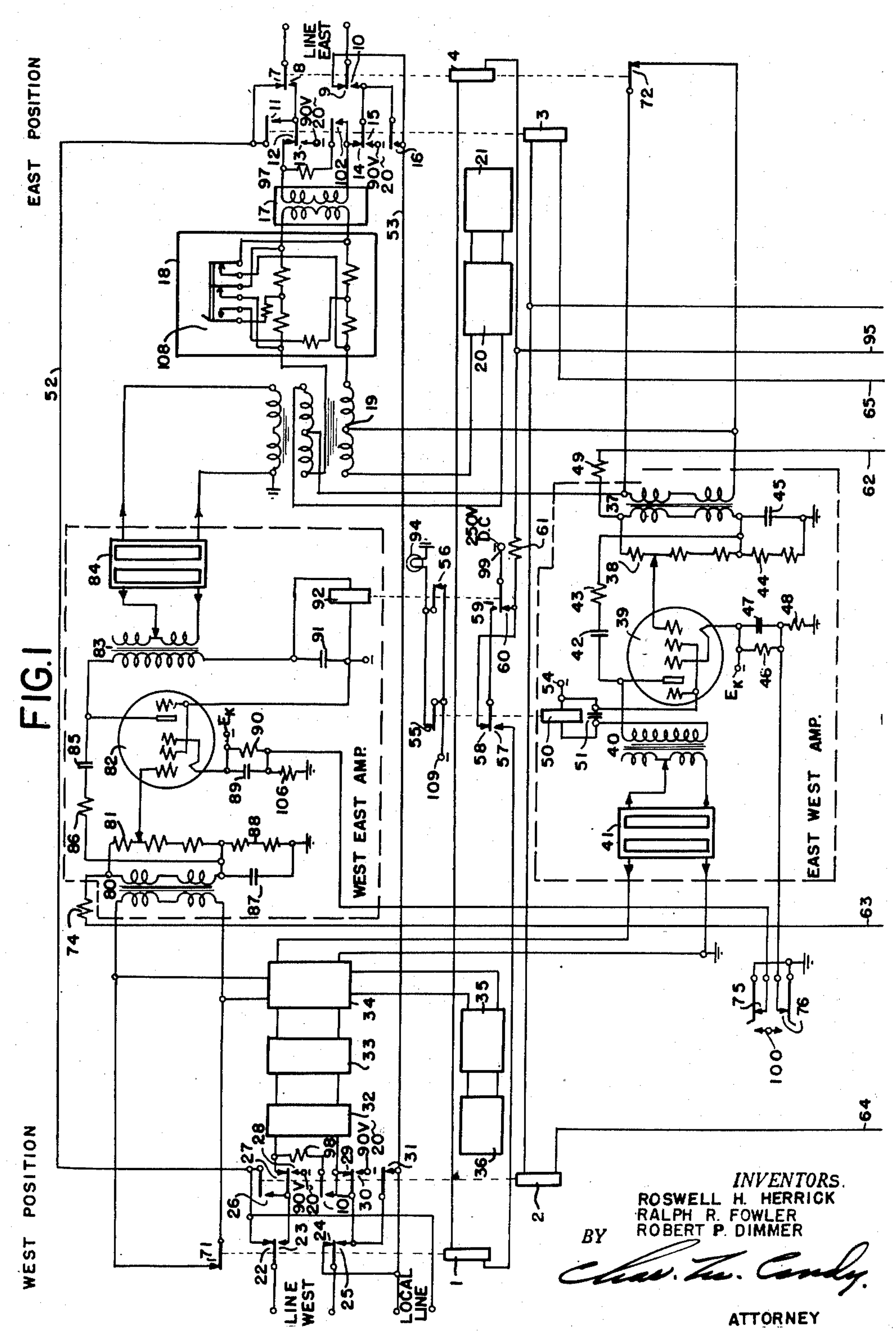

The present invention relates in general to two-way transmission systems which employ separate amplifying means for transmitting signals in each direction and is concerned more particularly with new and useful improvements in voice current repeaters.

It is an object of this invention to provide an improved method of frequency characteristic control for a standard 22 type repeater of simple and more economical design.

This improved control method utilized in conjunction with an improved ringing circuit is disclosed in the patent of Roswell H. Herrick No. 2,491,263 issued December 13, 1949.

A feature of this invention is the improved voice transmission effected by the rising frequency characteristic of the amplifier. The decrease of output with constant input as a result of increased frequency, which is a characteristic commonly encountered in telephone systems, is compensated for by the novel negative feedback circuit of the amplifier.

It is a further feature of the invention to provide a group of resistances in the feedback system thereby enabling a selection of the rising frequency characteristics desired in conformance with the particular application at hand. This feature is of special value in systems comprised of older telephone subsets where the problems of frequency characteristics are more numerous.

Another feature of the invention is the manner in which the repeater system is removed from the line and the connection switched through a by-pass channel in the event of either a tube or power supply failure in the amplifier.

An additional feature of this invention is the provision of a supervisory test key which enables an expeditious test of relay and tube operation. In conjunction with this, a further feature precludes singing in the system which would normally be effected as a result of the tremendous unbalance in the hybrid system at the time of testing.

Another feature of the invention pertains to the particular arrangement of test terminals as an aid to maintenance men for use in determining the grid bias.

It is still another feature of the invention to provide for a pair of leads connected between the repeater and a local exchange so that ringing signals may be established between three exchanges including a repeater circuit.

It is a further feature of the invention to provide means for preventing the singing initiated in the repeater by the unbalance in the system whenever a ring is repeated, from reaching the lines and the operators position.

Another feature of this invention is the supervisory lamp controlled by the amplifier relays which are connected so as to indicate anode circuit failure of any type.

Novel features believed to be characteristic of the invention are set forth with particularity in the appended claims. The invention, together with further objects and features thereof, will best be understood by reference to the following specification, taken in connection with the accompanying drawings, in which Figure 1 and Figure 2 when placed together as specified, illustrate a telephone repeater system having incorporated therein the features of the invention as briefly outlined above.

Figure 2:
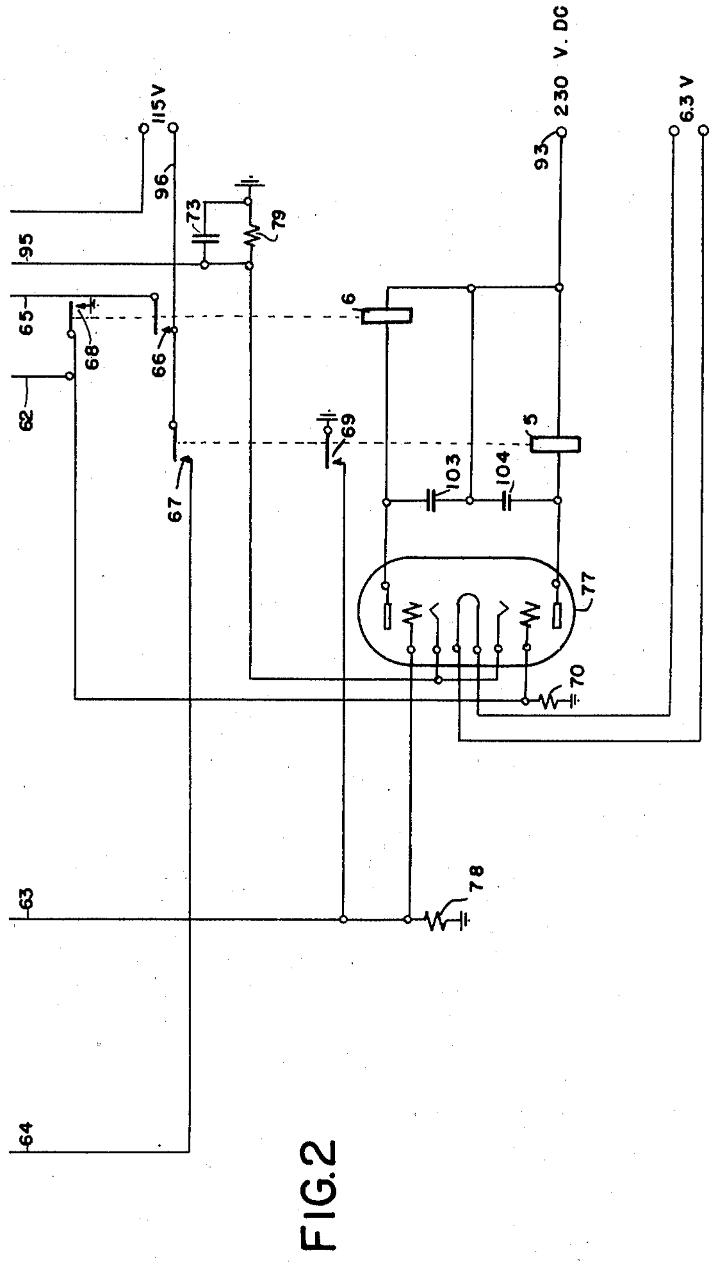

Referring now to the drawings, Figure 1 shows a conventional "22 type" repeater, that is, there are two distinct one way amplifiers arranged for use with an ordinary two way telephone circuit. In addition to the repeater circuit, Figure 2 shows a ringing control circuit with conductors therebetween. The system, briefly, consists of a repeater circuit, a ringing control circuit and a repeater by-pass channel.

The repeater is comprised of an east and west position, an east-west channel, and a west-east channel.

The line terminals are located at the east and west positions. When the line circuit enters the east position from the east lines, it will be connected to the line terminals at the west position either through the repeater by-pass channel or the east-west channel. The line voice current entering the west position from the west line terminals will be connected to the east line terminals either through the west-east channel or the repeater by-pass channel.

The by-pass channel is comprised of contacts 7 and 9, conductors 52 and 53, and contacts 22 and 24. The east-west channel consists of contacts 8 and 10, 12 and 14, repeating coil 17, balancing pads 18, hybrid system 19, east-west amplifier, hybrid system 34, balancing pad 33, repeating coil 32, contacts 27 and 29, and contacts 23 and 25. The west-east channel is comprised of contacts 23, 25, and 27, 29, repeater coil 32, balance pads 33 and 35, balancing network for the west line 36, hybrid system 34, west-east amplifier, hybrid system 19, balance pads 18 and 20, balance network for east line 21, repeater coil 17, contacts 12, and 14 and contacts 8 and 10.

The ringing control circuit consists of a two section triode tube 77, resistors 49, 70, 74, 78, 79, condensers 73, 103, 104, relays 1, 2, 3, 4, 5, and 6 and their associated contacts. The contacts of relay 5 and 6 are respectively 67, 69 and 66, 68 and are located in the ringing control circuit. Contacts 22, 23, 24, 25, 71 and 7, 8, 9, 10, 72 are associated respectively with relays 1 and 4 and are connected in the repeater circuit at the east and west positions. Relays 2 and 3, likewise, have their contacts 26, 27, 28, 29, 30, 31 and 11, 12, 13, 14, 15, 16 respectively positioned in the repeater circuit. The ringing control circuit also includes a ring-in east path associated with a control circuit for the ring out west, and a ring in west path associated with a control circuit for the ring out east.

The ring-in east path includes the east-west channel from the east line terminals through the secondary winding of the input transformer 37 at which point it passes through resistor 49, conductor 62, resistor 70, and the grid of the lower section of tube 77, thereby causing the completion of the path from a source of potential 93 through relay 5 and the lower section of tube 77. The ring-out west control circuit, which is utilized in combination with the ring-in east path, consists of an alternating current source of potential 96, contact 67, and relay 2. The path for a ringing signal from the west position is through the west-east channel to the secondary winding of the input transformer 80 and continues through resistor 74 conductor 63, the upper section of tube 77 and completes another path from the source of potential 93 through relay 6. The associated ring-out east control circuit is composed of contact 66, conductor 65, relay 3 and an alternating current source of potential 96.

Referring now more particularly to the operation of the system in the transmission of signals from the east position for repeated transmission to the west position. Assuming the repeater in the normally operated position relay 50 in the east amplifier and relay 92 in the west amplifier will be energized. The current paths of the energizing circuits are essentially the anode circuits of the tubes and more specifically for relay 50, from the high voltage source 54 through the relay 50, the primary winding of the coupling transformer 40, the anode-cathode circuit of amplifier tube 39, the resistance 46, and contact 76 to ground. An identical path is traceable for relay 92 in the west amplifier. Relays 50 and 92, therefore, at their respective contacts 57 and 59 complete a circuit in the ringing control system from the high voltage source 99, through relays 1 and 4 in series, through resistor 79 in shunt of condenser 73 to ground. Resistor 79 is of a predetermined value and effective in conjunction with either relays 1 and 4 or resistance 61 to supply the proper cathode bias to the two sections of tube 77. Relays 1 and 4 are therefore normally energized and at their respective contacts 23, 25 and 8, 10 connect the east and west lines to the repeater. Additionally, on operating, relays 1 and 4 remove the short circuit imposed on the repeater systems at their contacts 71 and 72.

Assume a ringing signal is received over the east line from a distant exchange and passes over contacts 8 and 10, 12 and 14, through repeating coil 17, balance pad 18, hybrid system 19, to the input transformer 37, where the signal voltage is increased for use with the high impedance grid circuit of tube 77. The signal, unable to pass further through the east-west amplifier circuit because of filter 41 travels over resistance 49 and conductor 62 to resistance 70 and ground. As a result of the incoming signal received through resistances 49 and 70, the required voltage is impressed upon the lower grid of tube 77 thereby causing the tube to become conductive and further complete the circuit of relay 5 from the source of potential 93. The value of current through the relay is a function of ringing signal frequency which is of an alternating current nature, a condenser 104 is placed in parallel with relay 5 to maintain the relay energized for the entire period of time that the incoming signal is effective. Relay 5 at its contacts 69 places a ground on the west repeater and thereby prevents the signal from initiating a singing disturbance within that circuit, and at its contacts 67 completes a circuit from the 115 volt source to relay 2. Relay 2 operates and at its contacts 27 and 29 breaks the line connection to the repeater channels and at its contacts 28 and 30 in the west position applies a 20 cycle signal to the west line through contacts 23 and 25. This ringing signal is likewise transmitted to a local circuit by relay 2 at its contacts 26 and 31. This circuit is employed in systems where the repeater system is located in the proximity of an exchange and through a predetermined code allows the operator at one exchange to contact either of the other two exchanges. Signals to the local line are transmitted by the east control circuit over the by-pass line when the ringing signal is applied at contacts 13 and 15 for a ring east signal. When the calling operator terminates the ringing signal, tube 77 again becomes nonconductive and stops the current supply to relay 5. Relay 5 releases and at its contact 67 breaks the holding circuit for relay 2. Relay 2 releases and at its contacts 26, 31 and 28, 30 terminates the ringing signal on the west and local lines.

When voice currents are imposed on the east line by the distant exchange, if the distance is at all large, a greatly attenuated voice current enters the repeating coil 17 of the telephone repeater.

In lines of varied construction, by means of key 108, it is possible to insert the conventional resistor balance pads 18 and 20 into the circuit whenever an imperfect balance exists over the requisite frequency range, thereby introducing a line loss which minimizes line discontinuities and permits overall balance. The voice current thereupon passes through a hybrid system 19, to the input transformer 37 of the east-west amplifier system, the input potentiometer gain control 38, amplifier tube 39, output transformer 40, filter 41, to hybrid system 34 at the west position, half of the energy being lost in the balancing network and the other half being transmitted through the balance pad system 33, the repeating coil 32 and over the west line via contacts 27, 29 and 23, 25.

The voice current value entering the amplifier tube 39 is controlled by the input potentiometer 38. The feedback connection from the plate passes through a condenser 42 and resistor 43 to a set of resistances 44 shunted by condenser 45 and to ground. Assuming a low voice frequency is transmitted to the amplifier, the tube will amplify in a normal manner. Being a low frequency, the feedback circuit impresses a large percentage of the potential across the input potentiometer 38 and resistances 44. This potential being approximately 180° out of phase with the input due to the tube characteristics, will be of a gain reducing nature and of a comparatively large value. With a voice current of higher frequency, however, a smaller amount of feedback will occur and cause greater amplification. The negative feedback is, therefore, a function of the input frequency, the gain reducing value being proportionally smaller with frequency increase. In view of the fact that telephone attenuation is such that the input to the receiver normally decreases with frequency increase, this negative feedback method of control is extremely practical. The value of resistance required for different systems is a variable factor and likewise the rising frequency characteristic desired is dependent entirely upon the nature of the installation and the surrounding environments. For this reason, resistance 44 is comprised of a group of 2 resistances, which may be selectively eliminated with by-pass straps. The insertion of a greater value of resistance naturally increases the rising frequency characteristic whereas the complete elimination of resistances will yield a flat response. Similar connections exist in the west amplifier and its manner of operation is identical to the sequence previously narrated.

Relays 50 and 92 are located in series with the anode circuit, and their contacts are interconnected in the ringing control circuit in such a manner that if anode current of either channel amplifier falls below the operating value, the relay associated with the failing system will deenergize, and thereupon break the circuits for relays 1 and 4 which in turn remove the repeaters from the line at their associated contacts 8, 10 and 23, 25 and connect the line terminals to the by-pass channel at their contacts 7, 9 and 22, 24. If relay 50 deenergizes, it will light supervisory lamp 94 at its contact 55. Relay 92, at its contact 56 will likewise light lamp 94, if the anode circuit of its associated amplifier fails in any manner.

Voice currents initiated on the west lines will be transmitted by the repeater through its west-east channel or by-pass channel in a similar manner to that signal transmitted through the east-west channel as previously described. The ringing signal initiated on the west conductor passes over the west-east channel to the input transformer of the west-east amplifier. The signal then passes through resistance 74, conductor 63, to resistor 78 which with resistor 74 is effective as a voltage divider. A voltage of predetermined value is impressed upon the grid of the second section of tube 77 as a result of the incoming signal receiver through resistors 74 and 78 and thereby energizes tube 77. Relay 6 energizes on the increased average anode current flow from source of potential 93 and at its contacts 66 completes a path from alternating current source 96 through relay 3 and at its contacts 68 places a ground on the east amplifier circuit. Relay 3 energizes and at its contacts 13 and 15 transmits a ring signal on the east line and at its contacts 12 and 14 breaks the line connection to the resistors and at its contacts 11 and 16 transmits a signal over the by-pass channel to the local line circuit. It will be noted that the ring-in east and ring-in west paths are grounded respectively by the operation of relay 6 and relay 5 thereby averting secondary line ringing effects caused by imperfect line balance.

The supervisory test key 100 when operated in the downward position removes ground from the anode circuit of tube 39 at its contact 76 and inserts resistance 48 in the anode cathode circuit. The IR drop across the resistance 48 places a high negative potential on the grid whereupon the anode current decreases and relay 50 deenergizes. The object of this key is to provide a simple and economical relay and tube test for the amplifier. The key when operated in the upward position makes a similar test on the west amplifier. When either relay deenergizes they will in turn break the circuits for relays 1 and 4 and insert equivalent resistance 61 in the cathode circuit of tube 77. At their contacts 71 and 72, relays 1 and 4 place a short circuit on the amplifiers which on reoperation precludes a singing disturbance from entering the line because of the extreme amount of unbalance in the hybrid system while the testing operation is being consummated.

Relays 2 and 3 accomplish a similar method of singing preclusive when they insert resistances 97 and 98 across the repeater systems at their respective contacts 101 and 102 during the ringing periods.

It will be noted that the input signal to the ringing control circuit is received from the output connection of the amplifier transformers. In this manner the hybrid system balance is maintained and the signal potential is properly increased for use with the triode tube without the need of a second transformer in the arrangement.

Terminals $E_K$ are located in the cathode circuits of tubes 39 and 82 as an aid to maintenance work and the grid bias value of the amplifier tube may be readily determined by inserting a voltmeter between terminal $E_K$ and ground.

A conventional power supply unit is used in combination with the voice repeater. The power supply unit is operated on a 115 volt, 60 circuit and includes a power transformer with various taps and a SU3GT tube which with the associated circuits is effective to supply the desired 250 volt source, 230 volt source and the 6.3 volt source.

It is to be understood that various modifications may be made in the form of this invention above described without departing from the spirit of the invention as cited in the appended claims.

What is claimed is:

1. In a transmission system, a line circuit, a voice current channel, a by-pass channel, an amplifier connected in said voice current channel, a vacuum tube in said amplifier including an anode circuit having a particular current value for normal operation, a relay connected in series with said anode circuit operated when said anode current is of said particular value and restored when said anode current deviates from said particular value, and means responsive to said relay for automatically connecting said line circuit to said voice current channel during periods of normal operation of said amplifier and for automatically connecting said line circuit to said by-pass channel during periods of deviation from said normal operation.

2. In a transmission system, a line circuit, a voice current channel, a by-pass channel, an amplifier connected in said voice current channel, a vacuum tube in said amplifier including an anode circuit having a particular current value for normal operation, a relay connected in series with said anode circuit operated when said anode current is of said particular value and restored when said anode current deviates from said particular value, means for automatically transferring said line circuit from said voice current channel to said by-pass channel and from said by-pass channel back to said voice current channel, and means responsive to said relay for operating said transfer means to thereby automatically connect said line circuit to said voice current channel during periods of normal operation of said amplifier and automatically connect said line circuit to said by-pass channel during periods of deviation from said normal operation.

3. In a transmission system, a pair of lines, a two-way voice current repeater including an amplifier connecting said lines, a by-pass channel for connecting said lines independent of said repeater, a vacuum tube in said amplifier including an anode circuit having a particular current value for normal operation, a relay connected in said anode circuit operated when said anode current is of said particular value and restored when said anode current deviates from said particular value, means responsive to release of said relay for automatically transferring said lines from said repeater to said by-pass channel during periods of deviation from said normal operation, and means for short circuiting said repeater at its points of connection to said lines, said last means operated in response to the release of said relay.

ROSWELL H. HERRICK.
RALPH R. FOWLER.
ROBERT P. DIMMER.

REFERENCES CITED

The following references are of record in the file of this patent:

UNITED STATES PATENTS

| Number | Name | Date |
|---|---|---|
| 1,729,983 | Brown | Oct. 1, 1929 |
| 1,829,803 | Korn | Nov. 3, 1931 |
| 2,104,844 | Affel | Jan. 11, 1938 |
| 2,202,522 | Gloess | May 28, 1940 |
| 2,229,089 | Kinsburg | Jan. 21, 1941 |
| 2,229,090 | Kinzer | Jan. 21, 1941 |
| 2,229,108 | Maggio et al. | Jan. 21, 1941 |
| 2,379,069 | Dysart | June 26, 1945 |
| 2,396,990 | Dysart | Mar. 19, 1946 |
| 2,429,775 | Seright | Oct. 28, 1947 |

FOREIGN PATENTS

| Number | Country | Date |
|---|---|---|
| 501,361 | Great Britain | Feb. 27, 1939 |